(12) United States Patent
Hostetler et al.

(10) Patent No.: US 11,813,558 B2
(45) Date of Patent: Nov. 14, 2023

(54) ATMOSPHERIC BOX

(71) Applicant: Honda Motor Co., Ltd., Tokyo (JP)

(72) Inventors: Landry M Hostetler, Dover, OH (US); Leigh Robert Smith, Jr., Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/716,488

(22) Filed: Apr. 8, 2022

(65) Prior Publication Data
US 2023/0321576 A1    Oct. 12, 2023

(51) Int. Cl.
*B01D 45/08* (2006.01)
*B60K 15/035* (2006.01)
*G01L 19/06* (2006.01)
*B60K 15/03* (2006.01)

(52) U.S. Cl.
CPC ............ *B01D 45/08* (2013.01); *B60K 15/035* (2013.01); *G01L 19/0627* (2013.01); *G01L 19/0654* (2013.01); *B60K 2015/0321* (2013.01); *B60K 2015/03523* (2013.01); *B60K 2015/03585* (2013.01)

(58) Field of Classification Search
CPC . B01D 45/08; G01L 19/0654; G01L 19/0627; B60K 15/035; B60K 2015/0321; B60K 2015/03523
See application file for complete search history.

(56) References Cited

U.S. PATENT DOCUMENTS

| | | | |
|---|---|---|---|
| 5,624,639 A | 4/1997 | Ariga et al. | |
| 5,692,637 A | 12/1997 | Hodge | |
| 7,055,391 B2 | 6/2006 | Tokuhara | |
| 7,406,875 B2 | 8/2008 | Wanami et al. | |
| 7,981,182 B2 | 7/2011 | Volchko | |
| 8,276,455 B2 | 10/2012 | Watanabe | |
| 9,623,357 B2 * | 4/2017 | Holzwarth | B01D 46/2403 |
| 9,919,242 B2 | 3/2018 | Yu | |
| 2014/0121560 A1 * | 5/2014 | Parks | A61B 10/02 600/562 |

(Continued)

FOREIGN PATENT DOCUMENTS

| CN | 110170205 A * | 8/2019 |
|---|---|---|
| DE | 102008002561 A1 | 8/2009 |
| DE | 102013213482 A1 | 1/2015 |

(Continued)

*Primary Examiner* — Atif H Chaudry
(74) *Attorney, Agent, or Firm* — Mark E. Duell; American Honda Motor Co., Inc.

(57) ABSTRACT

An atmospheric box for use with a fuel vent pressure sensor is operatively connected to a fuel tank of a vehicle. The atmospheric box includes a base including a floor, a sidewall extending upward from the floor and having an outer perimeter, and a drain hole opening in the floor, and a cover including a top section, an outer wall extending downward from the top section and having an inner perimeter substantially similar to the outer perimeter of the sidewall, thereby creating an interference fit between the cover and the base. An inner labyrinth wall extends downward from the top section inward of the sidewall, and a tube joint in the cover defines an opening inward of the inner labyrinth wall. The atmospheric box provides access to the atmosphere for measuring pressure while blocking water and debris intrusion.

18 Claims, 5 Drawing Sheets

SECTION A-A

(56) References Cited

U.S. PATENT DOCUMENTS

2020/0223418 A1    7/2020  Eto

FOREIGN PATENT DOCUMENTS

| | | | |
|---|---|---|---|
| JP | 2009068350 A | * | 4/2009 |
| JP | 4602386 B2 | | 12/2010 |
| WO | 2018046535 A1 | | 3/2018 |
| WO | 2019198720 A1 | | 10/2019 |

* cited by examiner

SECTION A-A

SECTION B-B

ATMOSPHERIC BOX

TECHNICAL FIELD

The embodiments described herein relate to relative air pressure measuring systems for a vehicle, and more specifically to an atmospheric box for use in conjunction with a fuel vent pressure sensor.

BACKGROUND

A fuel vent pressure sensor is typically located atop or inside of a fuel canister operatively connected to a fuel tank of the fuel system of a vehicle or within a fuel vent line for measuring pressure inside of the fuel system, purge flow, and as a monitor for fuel system leaks. The fuel vent pressure sensor enables the electronic control unit of the engine to identify leaks in the fuel system, alert a driver to a defective gas cap, indicate that the evaporative emissions system is operating properly, regulate the management of fuel consumption, and to maintain compliance with state and federal emissions regulations.

The fuel vent pressure sensor performs these tasks by monitoring the pressure, both positive and negative, in the fuel system. This fuel vent pressure sensor is an integral part of the vehicle evaporative emissions system, also known as EVAP. The EVAP system is designed to keep all gasoline vapors within the vehicle's fuel system. In order to operate properly, the fuel vent pressure sensor requires a reading of atmospheric air pressure outside of the fuel tank. However, the fuel vent pressure sensor is typically located on the bottom side of the vehicle where environment factors such as water and debris may act to prevent constant measurement of atmospheric air pressure. Therefore, there exists a need to provide unobstructed and untainted constant ambient air to the fuel vent pressure sensor.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, an atmospheric box for use with a fuel vent pressure sensor operatively connected to a fuel system of a vehicle includes a base including a floor, a sidewall extending upward from the floor and having an outer perimeter, and a drain hole opening in the floor, and a cover including a top section, an outer wall extending downward from the top section and having an inner perimeter substantially similar to the outer perimeter of the sidewall, thereby creating an interference fit between the cover and the base, an inner labyrinth wall extending downward from the top section inward of the sidewall, and a tube joint in the cover defining an opening inward of the inner labyrinth wall.

According to another aspect, an atmospheric box for use with a relative pressure sensor includes a base, a cover covering the base, and a tube joint in the cover for connecting a tube that connects the atmospheric box to the relative pressure sensor.

According to yet another aspect, a system for measuring atmospheric pressure for a fuel system of a vehicle includes a fuel vent pressure sensor attached to the fuel system and an atmospheric box for use with the fuel vent pressure sensor operatively connected to a fuel system. The atmospheric box includes a base including a floor, a sidewall extending upward from the floor and having an outer perimeter, and a drain hole opening in the floor, and a cover including a top section, an outer wall extending downward from the top section and having an inner perimeter substantially similar to the outer perimeter of the sidewall, thereby creating an interference fit between the cover and the base, an inner labyrinth wall extending downward from the top section inward of the sidewall, and a tube joint in the cover defining an opening inward of the inner labyrinth wall.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
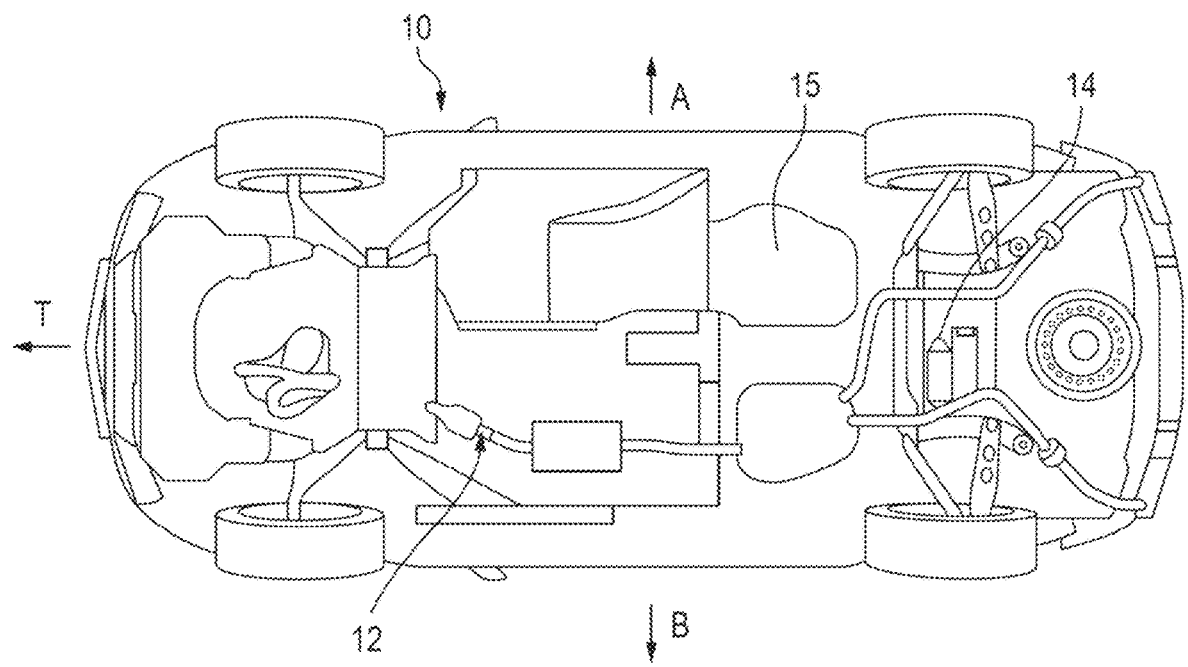
FIG. 1 is bottom view of a vehicle.
Figure 2:
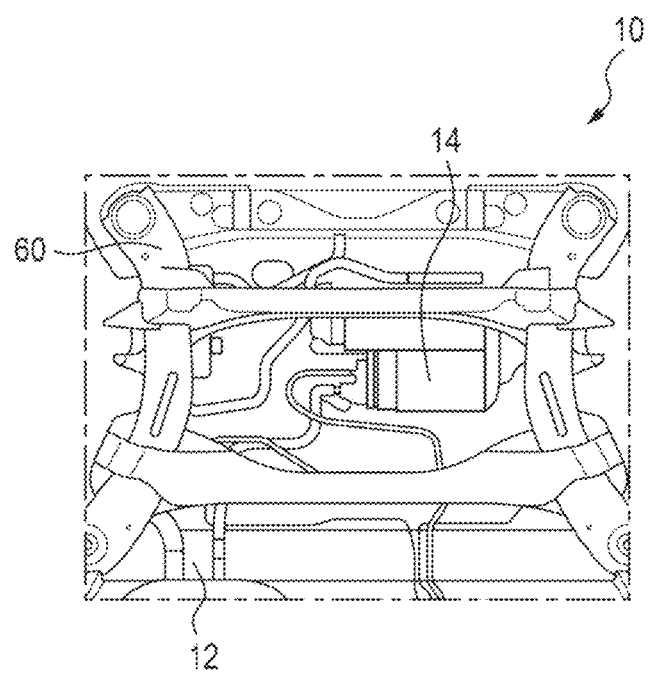
FIG. 2 is a bottom view of a portion of the vehicle.
Figure 3:
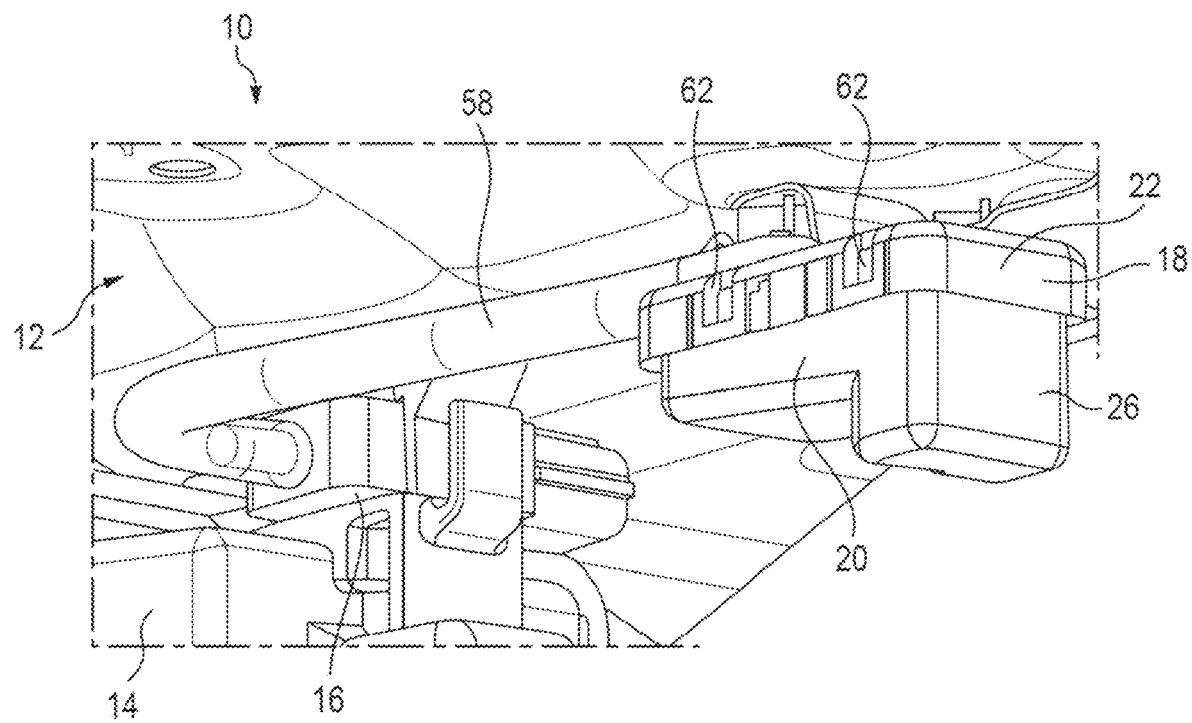
FIG. 3 is a perspective view of an atmospheric box located on the bottom portion of the vehicle of FIGS. 1-2.
Figure 4:
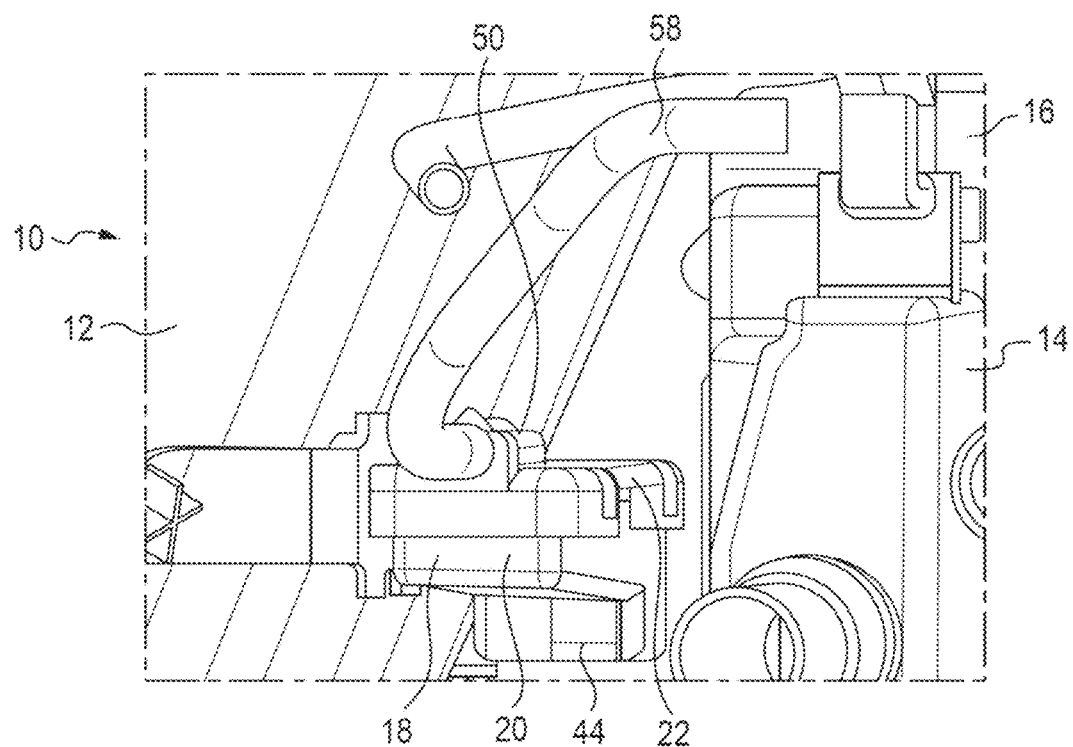
FIG. 4 is another perspective view of the atmospheric box located on the bottom portion of the vehicle of FIGS. 1-2.
Figure 5:
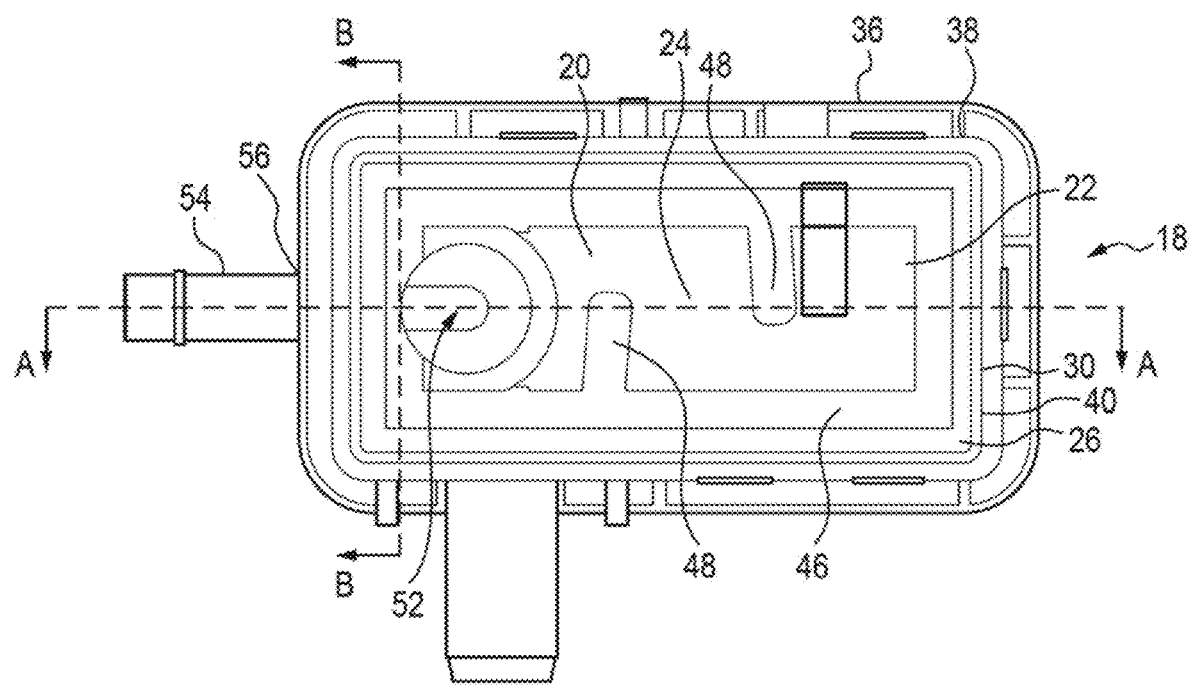
FIG. 5 is a bottom view of the atmospheric box illustrated with a transparent base.
Figure 6:
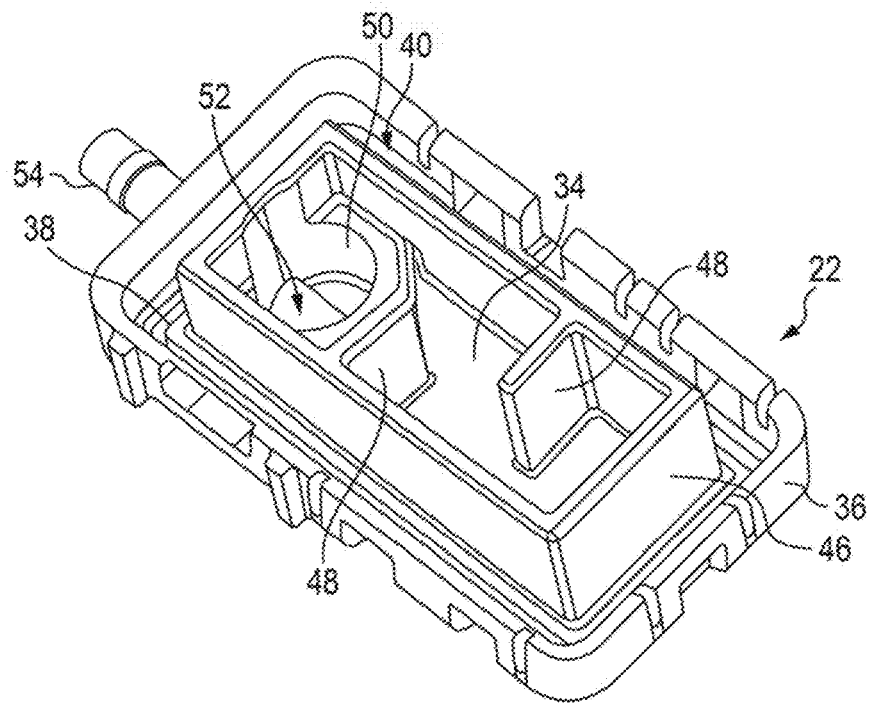
FIG. 6 is a bottom perspective view of a cover of the atmospheric box.
Figure 7:
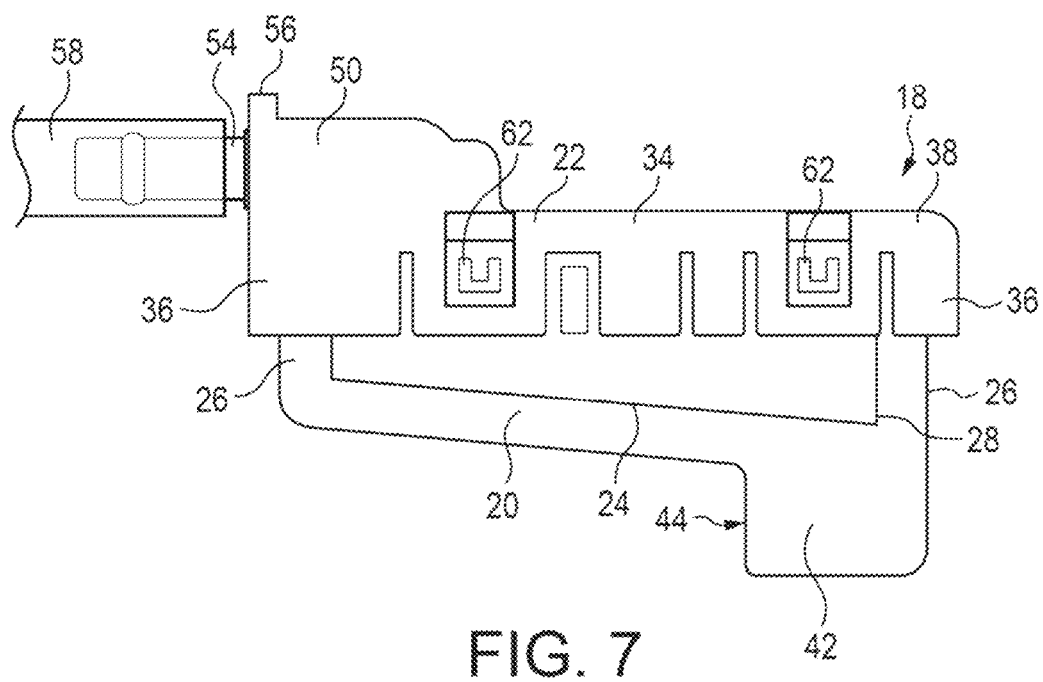
FIG. 7 is a side view of the atmospheric box with a transparent base.
Figure 8:
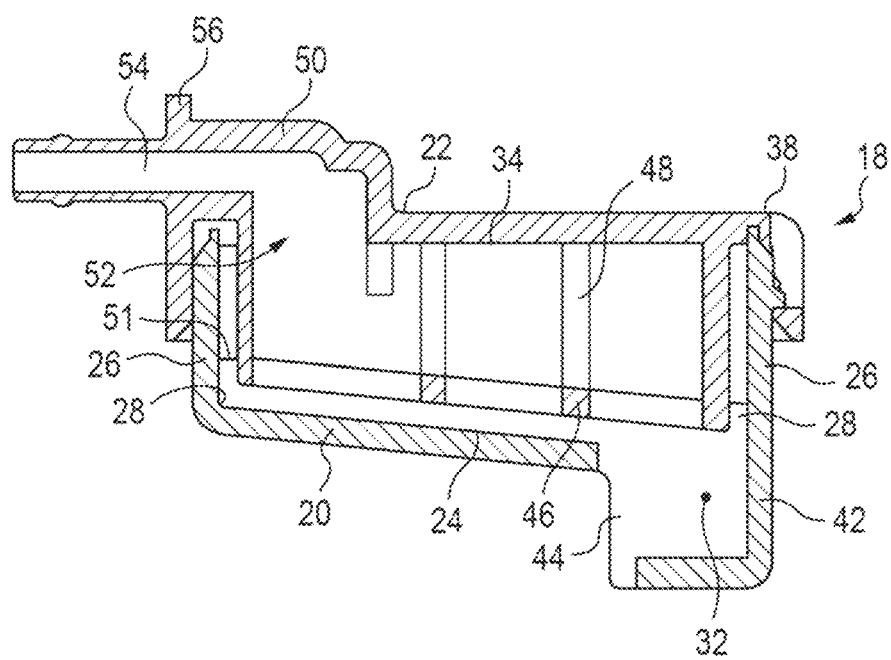
FIG. 8 is a cross section of the atmospheric box taken along line A-A of FIG. 5.

FIG. 1 illustrates the bottom side 12 of a vehicle 10 that includes a fuel canister 14 operatively connected to the fuel tank 15, which are portions of the fuel system of the vehicle 10. Fuel systems monitor and reduce evaporative emissions from a vehicle 10, measure purge flow, and detect system leakage by measuring the pressure inside of fuel system by use of a fuel vent pressure sensor 16 located atop or inside of the fuel canister 14, as illustrated in FIGS. 2-4, or within a fuel vent line.

For the fuel vent pressure sensor 16 to operate properly, the fuel vent pressure sensor 16 must have access to an accurate measure of atmospheric air pressure to accurately determine pressure in the fuel canister 14 and overall fuel system attributable to fuel, and the pressure attributable to atmospheric conditions. In order to provide atmospheric air to the fuel vent pressure sensor 16 that is not polluted with water or debris, an atmospheric box 18 is provided with an internal structure that creates an air pocket to prevent water intrusion. The atmospheric box 18 is connected by a tube 58 to the fuel vent pressure sensor 16 that detects atmospheric pressure.

FIGS. 5-9 illustrate the atmospheric box 18 in greater detail. The atmospheric box 18 includes a base 20 and a cover 22. The base 20 includes a floor 24 generally rectangular in shape and a sidewall 26 extending upward from an outer edge 28 of the floor 24. The sidewall 26 has an outer perimeter 30. The base 20 also includes a drain hole opening 32 in the floor 24 that allows water to flow in and out of the atmospheric box 18. The drain hole opening 32 is formed as a portion 42 of the sidewall 26 below the floor 24 and defines a port 44 through which water and air may pass into and out of the atmospheric box 18. The floor 24 of the base 20 may be slanted downwardly toward the drain hole opening 32 to facilitate the flow of water downward and out of the atmospheric box 18.

The cover 22 includes a top section 34 that is also generally rectangular in shape that matches the shape of the floor 24 of the base 20. The top section 34 includes an outer wall 36 that extends downwardly from and outer edge 38 of the top section 34. The outer wall 36 has an inner perimeter 40 substantially similar to the outer perimeter 30 of the sidewall 26 of the base 20, thereby creating an interference fit between the cover 22 and the base 20 with the inclusion of interference fit fasteners 62.

The cover 22 further may include an inner labyrinth wall 46 extending downward from the top section 34 inward of the sidewall 26 when the cover 22 and base 20 are assembled. The inner labyrinth wall 46 may include one or more ribs 48 to block water or debris from moving upward in the atmospheric box 18 toward a tube joint 50 located in the cover. The tube joint 50 includes an opening 52 inward of the inner labyrinth wall 46 on the inside 54 of the atmospheric box 18. The opening 52 of the tube joint 50 further proceeds through a cylindrical extension 54 on the exterior 56 of the atmospheric box that engages a tube 58. The tube 58 connects the atmospheric box 18 and the fuel vent pressure sensor 16 as illustrated in FIGS. 3-4.

Figure 9:
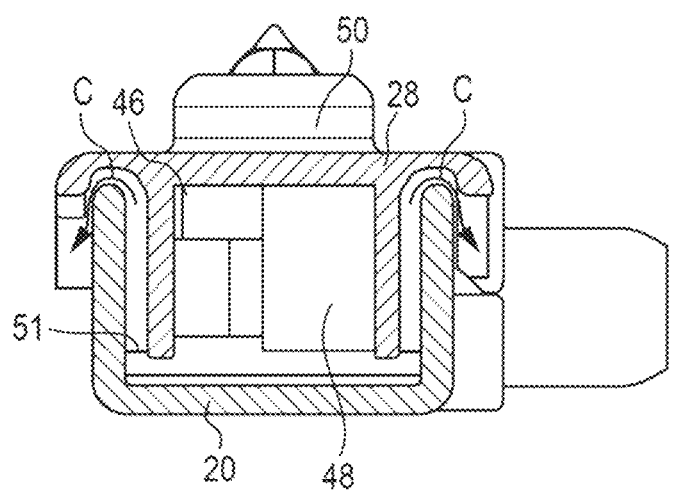
FIG. 9 is a cross section of the atmospheric box taken along line B-B of FIG. 5.

The atmospheric box 18 operates by enabling the creation of an air pocket around the tube joint 50, which is at the highest point of the floor 24 and atmospheric box 18 that prevents water from entering the tube 58 and contacting the fuel vent pressure sensor 16. Additionally, water is prevented from accumulating in the tube 58 where it may freeze and create an obstruction. The labyrinth wall 46 and ribs 48 slow the inward flow of water, thereby allowing for the formation of an air pocket in the tube joint 50, while further preventing the intrusion of debris that may block or enter the tube 58 via the tube joint 50. As illustrated in FIG. 9, there is no seal or sealing function between the cover 22 and the base 20, which allows air to drain out of the atmospheric box 18 as illustrated by arrows C during a submersion condition that is outside of the labyrinth wall 46. The air inside of the labyrinth wall is trapped inside the atmospheric box 18 by the labyrinth wall 46 and the water level 51 in the atmospheric box 18 during a submersion condition. Therefore, fuel vent pressure sensor 16 is always supplied with air that may be used to measure atmospheric pressure conditions.

The atmospheric box 18 may be connected to the frame 60 of the vehicle 10 by any known method such as fasteners or the like. The atmospheric box 18 may be aligned such that the port 44 is aligned in a direction that is the same as a direction of the opening 52 of the tube joint 50. Both the port 44 and opening 52 of the tube joint 50 may be oriented in a lateral direction, arrows A, B in FIG. 1, whether to the driver side A or passenger side B, to further limit the intrusion of water splashed in a direction of travel, arrow T, in a longitudinal direction. Other alignments of the atmospheric box 18 may also be applied due to alignment of parts in the vehicle 10.

While the atmospheric box 18 is discussed for use with a fuel pressure vent sensor 16, the atmospheric box 18 may also be applied with any other relative or ambient pressure sensor located on the vehicle 10 in order to prevent the intrusion of water or debris from blocking measurement of relative or ambient air pressure.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. An atmospheric box for use with a fuel vent pressure sensor operatively connected to a fuel system of a vehicle, comprising:
    a base, the base comprising:
        a floor;
        a sidewall extending upward from the floor and having an outer perimeter; and
        a drain hole opening in the floor, the floor of the base being slanted downwardly toward the drain hole opening comprising an extension of a portion of the sidewall below the floor defining a port through which water and air pass; and
    a cover, the cover comprising:
        a top section;
        an outer wall extending downward from the top section and having an inner perimeter substantially similar to the outer perimeter of the sidewall, thereby creating an interference fit between the cover and the base;
        an inner labyrinth wall extending downward from the top section inward of the sidewall; and
        a tube joint in the cover defining an opening inward of the inner labyrinth wall, wherein the tube joint comprises an external cylindrical portion configured to receive a tube, the tube connecting the atmospheric box to the fuel vent pressure sensor.

2. The atmospheric box of claim 1 wherein the inner labyrinth wall extending downward from the top section is generally rectangular in shape and further comprises at least one inward facing rib for slowing the inward flow of water and allowing for the formation of an air pocket in the tube joint.

3. An atmospheric box for use with a relative pressure sensor, comprising:
    a base, comprising:
        a floor slanted downwardly toward the drain hole opening;
        a sidewall extending upward from the floor and having an outer perimeter; and a drain hole opening in the floor comprising an extension of a portion of the sidewall below the floor defining a port through which water and air pass;
a cover covering the base; and
a tube joint in the cover for connecting a tube that connects the atmospheric box to the relative pressure sensor, the tube joint comprises an external cylindrical portion configured to receive a tube.

4. The atmospheric box of claim 3 wherein the cover comprises:
a top section;
an outer wall extending downward from the top section and having an inner perimeter substantially similar to the outer perimeter of the sidewall, thereby creating an interference fit between the cover and the base; and
an inner labyrinth wall extending downward from the top section inward of the sidewall.

5. The atmospheric box of claim 4 wherein the tube joint defines an opening inward of the inner labyrinth wall.

6. The atmospheric box of claim 5 wherein the inner labyrinth wall extending downward from the top section is generally rectangular in shape and further comprises at least one inward facing rib for slowing the inward flow of water and allowing for the formation of an air pocket in the tube joint.

7. A system for measuring atmospheric pressure for a fuel system of a vehicle, comprising:
a fuel vent pressure sensor attached to the fuel system;
an atmospheric box for use with the fuel vent pressure sensor operatively connected to the fuel system, comprising:
a base, the base comprising:
a floor;
a sidewall extending upward from the floor and having an outer perimeter; and
a drain hole opening in the floor, wherein the floor is slanted downwardly toward the drain hole opening, wherein the drain hole opening comprises an extension of a portion of the sidewall below the floor defining a port through which water and air pass; and
a cover, the cover comprising:
a top section;
an outer wall extending downward from the top section and having an inner perimeter substantially similar to the outer perimeter of the sidewall, thereby creating an interference fit between the cover and the base;
an inner labyrinth wall extending downward from the top section inward of the sidewall; and
a tube joint in the cover defining an opening inward of the inner labyrinth wall and comprising an external cylindrical portion configured to receive a tube connecting the atmospheric box to the fuel vent pressure sensor.

8. The system of claim 7 wherein the inner labyrinth wall extending downward from the top section is generally rectangular in shape and further includes at least one inward facing rib for slowing the inward flow of water and allowing for the formation of an air pocket in the tube joint.

9. An atmospheric box for use with a fuel vent pressure sensor operatively connected to a fuel system of a vehicle, comprising:
a base, the base comprising:
a floor;
a sidewall extending upward from the floor and having an outer perimeter; and
a drain hole opening in the floor; and
a cover, the cover comprising:
a top section;
an outer wall extending downward from the top section and having an inner perimeter substantially similar to the outer perimeter of the sidewall, thereby creating an interference fit between the cover and the base;
an inner labyrinth wall extending downward from the top section inward of the sidewall;
a tube joint in the cover defining an opening inward of the inner labyrinth wall; and
wherein the inner labyrinth wall extending downward from the top section is generally rectangular in shape and further comprises at least one inward facing rib for slowing the inward flow of water and allowing for the formation of an air pocket in the tube joint.

10. The atmospheric box of claim 9 wherein the tube joint comprises an external cylindrical portion configured to receive a tube.

11. The atmospheric box of claim 10 wherein the tube connects the atmospheric box to the fuel vent pressure sensor.

12. The atmospheric box of claim 11 wherein the floor of the base is slanted downwardly toward the drain hole opening.

13. The atmospheric box of claim 12 wherein the drain hole opening comprises an extension of a portion of the sidewall below the floor defining a port through which water and air pass.

14. A system for measuring atmospheric pressure for a fuel system of a vehicle, comprising:
a fuel vent pressure sensor attached to the fuel system;
an atmospheric box for use with the fuel vent pressure sensor operatively connected to the fuel system, comprising:
a base, the base comprising:
a floor;
a sidewall extending upward from the floor and having an outer perimeter; and
a drain hole opening in the floor; and
a cover, the cover comprising:
a top section;
an outer wall extending downward from the top section and having an inner perimeter substantially similar to the outer perimeter of the sidewall, thereby creating an interference fit between the cover and the base;
an inner labyrinth wall extending downward from the top section inward of the sidewall;
a tube joint in the cover defining an opening inward of the inner labyrinth wall; and
wherein the inner labyrinth wall extending downward from the top section is generally rectangular in shape and further includes at least one inward facing rib for slowing the inward flow of water and allowing for the formation of an air pocket in the tube joint.

15. The system of claim 14 wherein the tube joint comprises an external cylindrical portion configured to receive a tube.

16. The system of claim 15 wherein the tube connects the atmospheric box to the fuel vent pressure sensor.

17. The system of claim 16 wherein the floor of the base is slanted downwardly toward the drain hole opening.

18. The system of claim 17 wherein the drain hole opening comprises an extension of a portion of the sidewall below the floor defining a port through which water and air pass.

* * * * *